Figure 2:
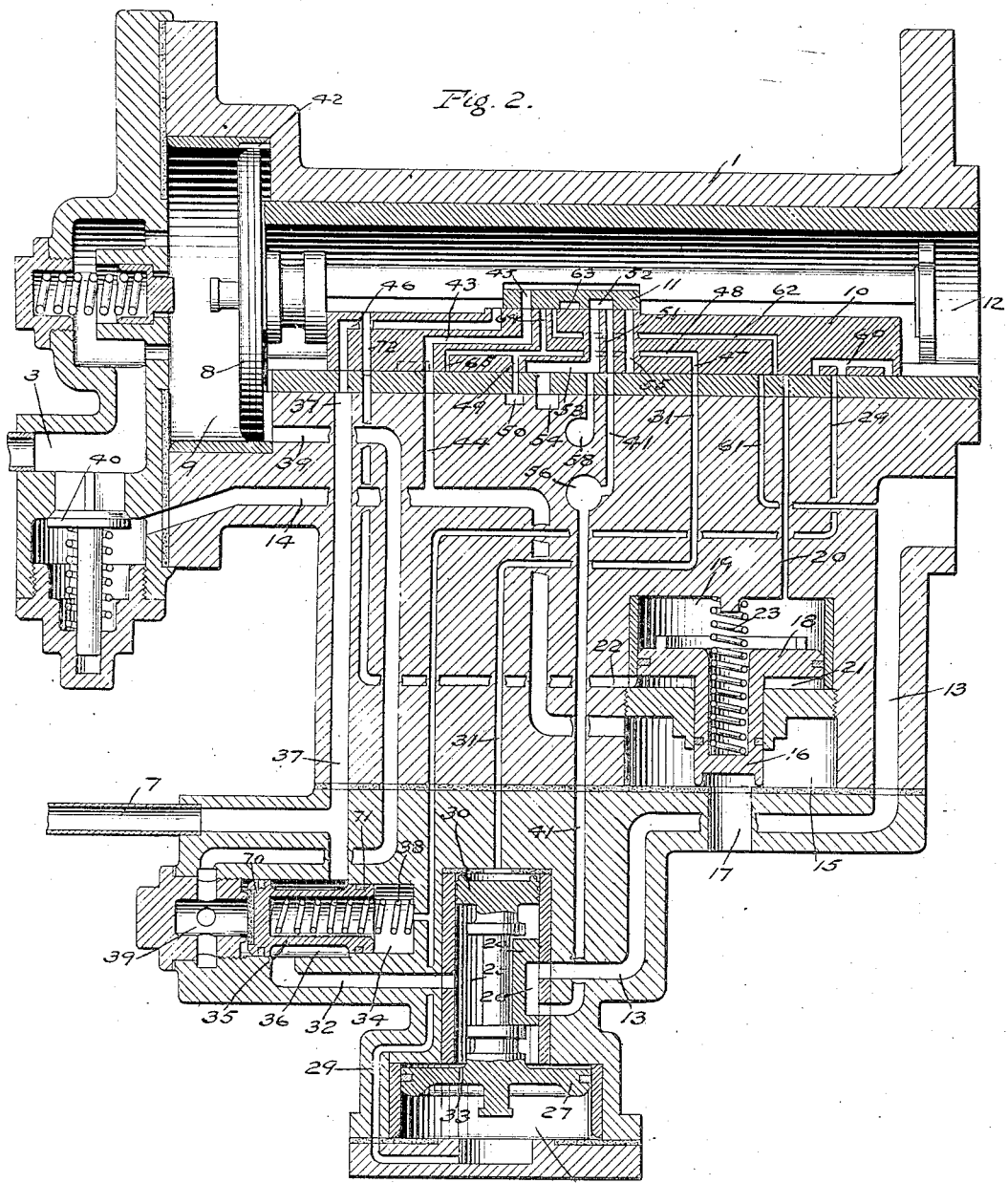

W. V. TURNER.
QUICK ACTION TRIPLE VALVE DEVICE.
APPLICATION FILED MAR. 8, 1909.

1,112,493.

Patented Oct. 6, 1914.
4 SHEETS—SHEET 1.

WITNESSES
Wm. M. Cady
J. S. Custer

INVENTOR
Walter V. Turner
by E. Wright
Att'y.

W. V. TURNER.
QUICK ACTION TRIPLE VALVE DEVICE.
APPLICATION FILED MAR. 8, 1909.
1,112,493.
Patented Oct. 6, 1914.
4 SHEETS—SHEET 2.
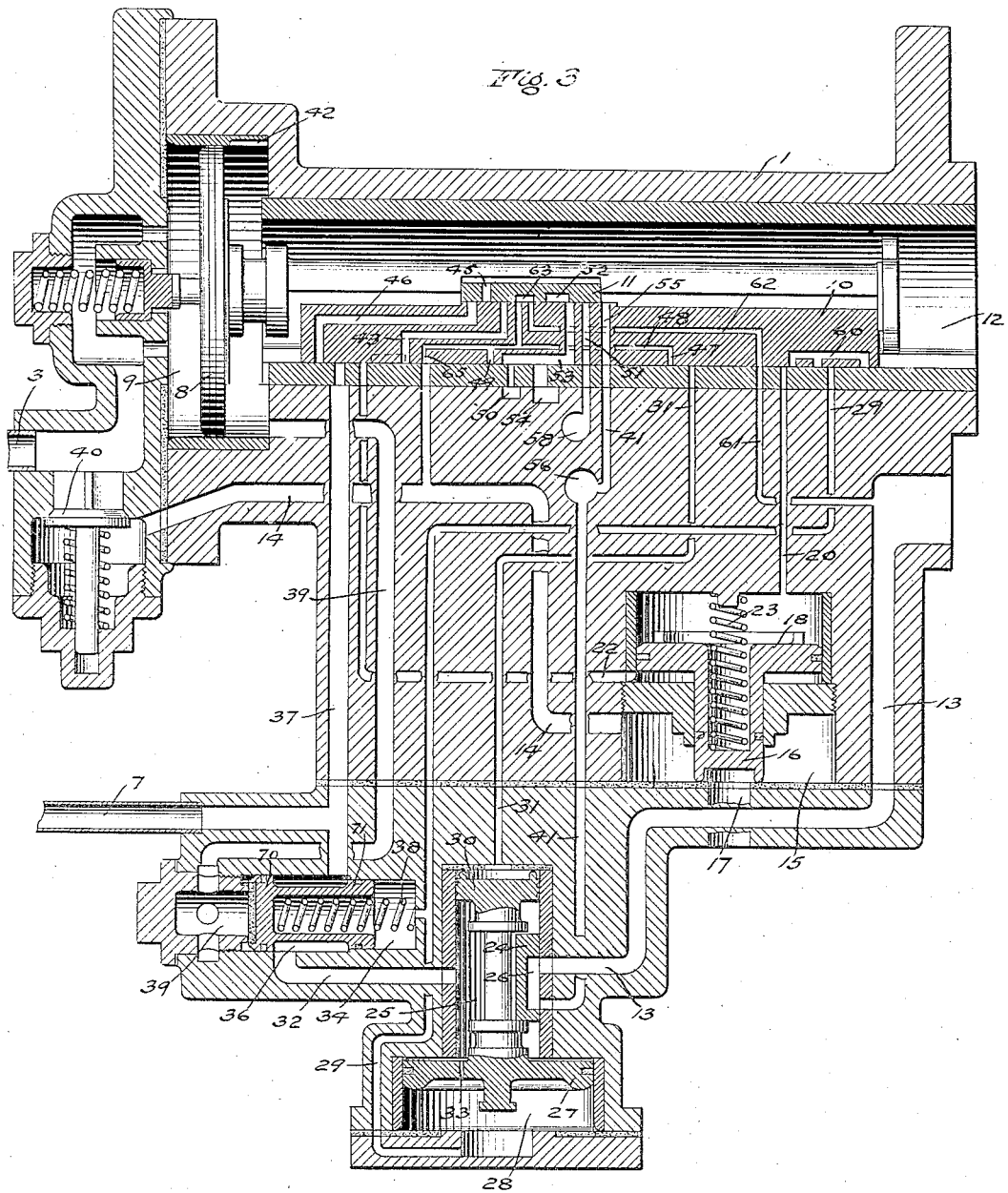

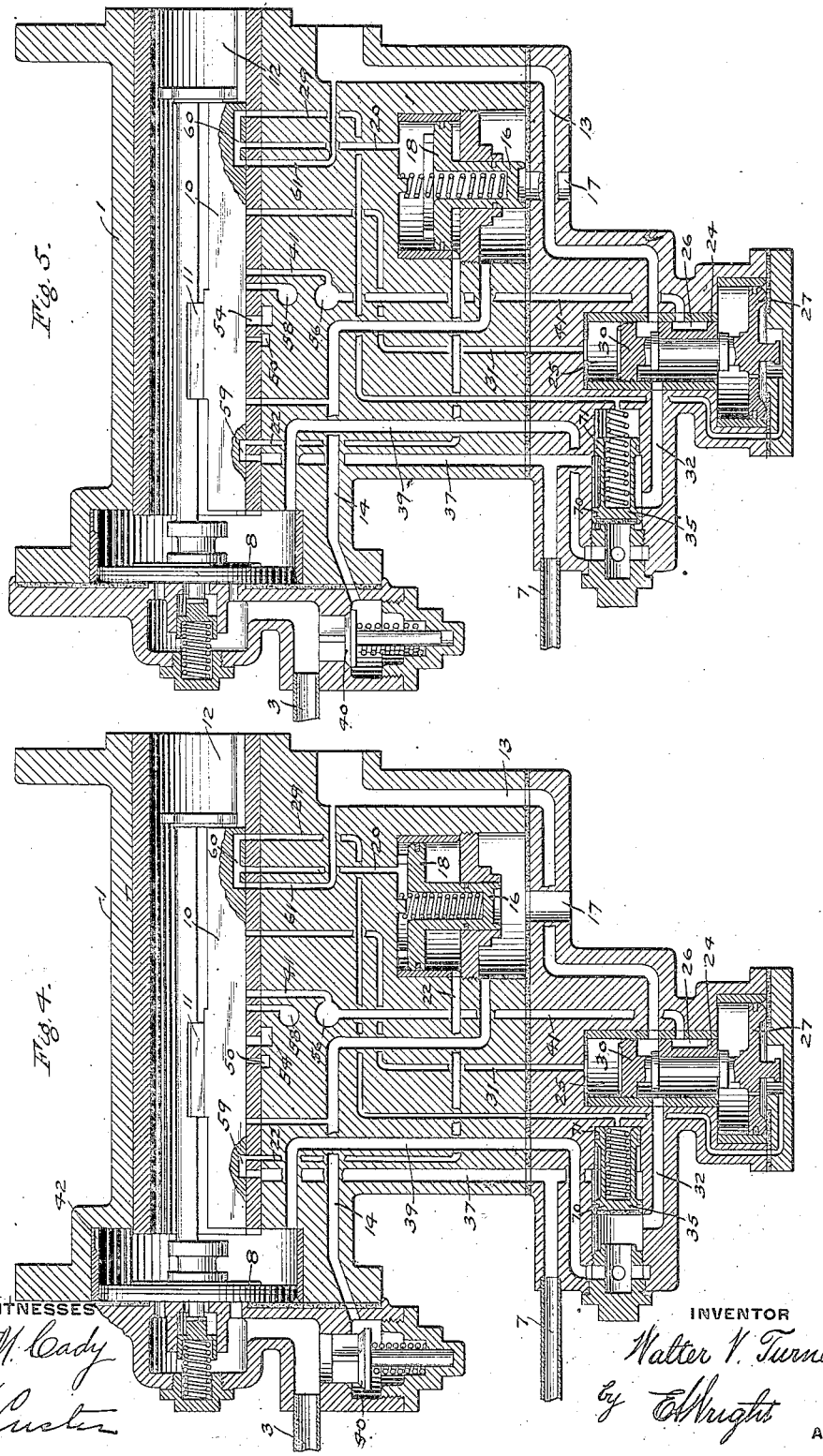

W. V. TURNER.
QUICK ACTION TRIPLE VALVE DEVICE.
APPLICATION FILED MAR. 8, 1909.
1,112,493.
Patented Oct. 6, 1914.
4 SHEETS—SHEET 4.
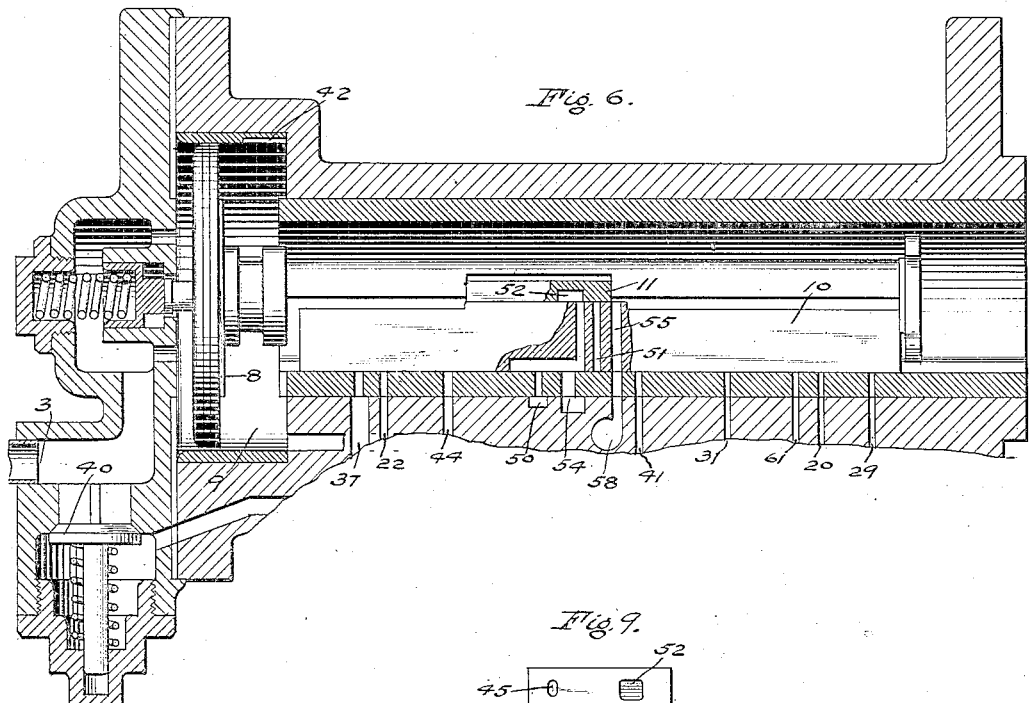
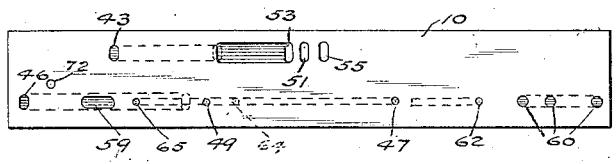
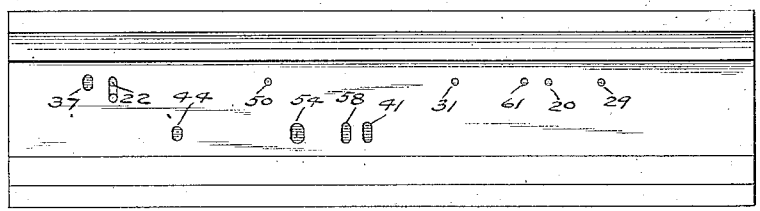
WITNESSES
INVENTOR
Walter V. Turner
by E. H. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

QUICK-ACTION TRIPLE-VALVE DEVICE.

1,112,493.

Specification of Letters Patent. Patented Oct. 6, 1914.

Application filed March 3, 1909. Serial No. 481,942.

*To all whom it may concern:*

Be it known that I, WALTER V. TURNER, a citizen of the United States, residing at Edgewood, in the county of Allegheny and State of Pennsylvania, have invented new and useful Improvements in Quick-Action Triple-Valve Devices, of which the following is a specification.

This invention relates to fluid pressure brakes, and more particularly to a quick action triple valve device.

In the running of railway trains, circumstances often arise where it is highly desirable and even extremely urgent that an emergency application of the brakes be produced, in which quick serial action as well as a certain degree of brake cylinder pressure higher than that obtainable in service applications can be secured, following one or more service applications of the brakes.

The quick action triple valve devices as heretofore constructed have either been incapable of emergency action after having once assumed service application position, or where the emergency valve mechanism depends for operation upon train pipe, auxiliary reservoir, or brake cylinder pressures, the emergency action is secured with increasing difficulty as the equalization point or full service pressure in the brake cylinder is approached. On the other hand, it is highly desirable to be able to make graduated reductions in train pipe pressure, even after the auxiliary reservoir and brake cylinder pressures have fully equalized, without any possibility of causing an emergency application, or at least until the train pipe pressure has been lowered by successive gradual reductions or leakage to such a low degree of pressure as to render almost certain the necessity for producing an emergency application even though the engineer makes no effort to secure such action.

The principal object of my invention is to provide an improved quick action triple valve device capable of accomplishing the above results, that is to say, to secure emergency action at all times upon a sudden reduction in train pipe pressure, regardless of previous service applications and likewise to prevent such emergency action at all times upon gradual reductions in train pipe pressure, even after full equalization of auxiliary reservoir and brake cylinder pressures.

Another feature of my improvements contemplates the employment of the fluid pressure from an additional or supplemental source of fluid pressure to operate the quick action emergency valve mechanism upon a sudden reduction in train pipe pressure, so as to insure the action of said mechanism whenever desired.

Figure 1:
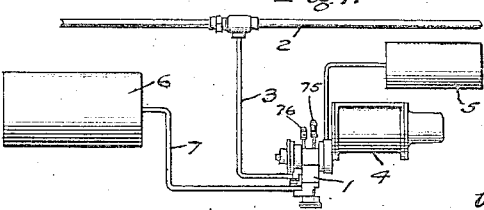

In the accompanying drawings; Figure 1 is a diagrammatic view illustrating a car air brake equipment with my improvements applied thereto; Fig. 2 a central sectional view of a quick action triple valve device embodying my invention, showing the parts in normal full release position; Fig. 3 a similar view, but showing the position assumed by the parts in service application position; Fig. 4 a like view, showing the parts in emergency application position as assumed if the movement is primarily produced by a sudden reduction in train pipe pressure; Fig. 5 a similar view, showing the parts in their final position in an emergency application of the brakes; Fig. 6 a fragmentary sectional view showing port connections made by the triple valve device in a position intermediate service application position and emergency application position; Fig. 7 a plan view of the seat for the main slide valve of the triple valve; Fig. 8 a face view of the main slide valve, showing the relative location of the ports and cavities; Fig. 9 a face view of the auxiliary or graduating valve which is adapted to be mounted on and have a movement relative to the main slide valve; and Fig. 10 a fragmentary sectional view of a modified form of the separate valve device for controlling the admission of fluid from the auxiliary and supplemental reservoirs to the brake cylinder in emergency applications.

Quick action triple valve device 1 embodying my improvement, may be connected up in the usual manner as shown diagrammatically in Fig. 1 of the drawings, the car brake equipment comprising the usual train pipe 2 connected to the triple valve device 1 by branch pipe 3, a brake cylinder 4, an auxiliary reservoir 5, and a supplemental reservoir 6, connected to the triple valve device by pipe 7. Triple valve device 1 comprises piston 8 mounted in piston chamber 9, main slide valve 10 and graduating valve 11, contained in valve chamber 12, the piston chamber being connected as usual to the train pipe branch 3 and the valve chamber to the auxiliary reservoir. The brake cylinder 4 is open communication with brake cylinder passage 13. Quick action vent passage 14 leads from the train pipe branch 3 past check valve 40 to the vent chamber 15, the outlet 17 from which is controlled by a quick action vent valve 16. As shown, the vent outlet 17 opens to the atmosphere but if desired may be connected to the brake cylinder or elsewhere. The vent valve 16 is adapted to be actuated by a movable abutment 18, contained in a piston chamber, the portion 19 on one side of the abutment communicating with a port 20 leading to the seat of the main slide valve 10 and the chamber 21 on the opposite side of the abutment communicating with a port 22 also leading to the main slide valve seat. A spring 23 acts on abutment 18 in a direction tending to close the vent valve 16. The brake cylinder passage 13 leads to the seat of a slide valve 24 contained in a valve chamber 25 and in one position of the valve a cavity 26 therein connects the brake cylinder passage 13 with a port 41 leading to the main slide valve seat. The valve 24 is operated by means of a differential piston the larger head 27 of which is contained in a piston chamber 28, the portion of the chamber at the outer face of this head communicating with a port 29 leading to the main slide valve seat. The other head 30 of the differential piston is contained in the valve chamber 25 and the space at its outer face communicates with a port 31 leading to the main slide valve seat. The portion of the valve chamber between the differential heads is in open communication with a passage 32, through which the valve chamber is charged with fluid under pressure and the piston head 27 is provided with a small port 33 to normally permit equalization of pressures on its opposite sides. Passage 32 opens into a chamber 34 containing a movable abutment 35 having differential piston heads 70 and 71, the chamber having a cylindrical recess 36 which is adapted in one position of the abutment to connect passage 32 with a passage 37. This passage 37 is in open communication with the supplemental reservoir pipe 7 and also leads to the main slide valve seat. A spring 38 tends to maintain the abutment 35 in position connecting passage 32 with passage 37 and also holds the abutment to a seat controlling communication to a passage 39, in constant open communication with the auxiliary reservoir. The chamber at the outer face of the opposite head of the abutment 35 is connected to the passage 29 leading to the main slide valve seat.

In operation, the auxiliary reservoir is charged up to the standard pressure carried in the system through the usual feed groove 42 around the triple valve piston and also through quick recharge port 43 in the main slide valve 10 which registers with port 44 leading to the train pipe vent passage 14 and with through port 45 in the graduating valve 11 when the parts are in normal full release position. The supplemental reservoir 6 is charged through the port 46 which registers in release position with supplemental reservoir port 37, and port 29 being closed by the main slide valve, fluid under pressure equalizes around the movable abutment 35, so that spring 38 holds the same in the position closing port 39 and establishing communication from passage 37 to passage 32 and valve chamber 25. In release position of the parts, passage 31 registers with port 47 of cavity 48 in the main slide valve, a branch port 49 of which also registers with an atmospheric exhaust port 50. The chamber at the outer face of piston head 30 is therefore at atmospheric pressure and consequently fluid under pressure equalizing through the port 33 in the piston head 27 exerts an unbalanced pressure on the head which shifts the piston so as to seat the piston head 30. Any leakage of air from the train pipe around the stem of the vent valve 16 equalizes into the auxiliary reservoir through the port 22 leading to emergency piston chamber 21, a port 72 in the main slide valve registering with port 22 in release position and the fluid under pressure also leaks around the piston 18 and equalizes into the chamber 19 at the opposite face of the piston 18, and therefore the spring 23 maintains the vent valve 16 on its seat, closing the vent outlet 17. Brake cylinder port 13 is now connected with port 41 by the cavity 26 and port 41 registers with port 51 in the main slide valve which in turn is connected through a cavity 52 in the graduating valve 11 with port 53 and exhaust port 54, so that the brake cylinder is open to the atmosphere.

A service application of the brakes is effected in the usual manner by causing a gradual reduction in train pipe pressure, which shifts the triple valve parts to service application position, as shown in Fig. 3 of the drawings. The preliminary movement of the triple valve piston shifts the graduating valve to close ports 46 and 43 and also to close the brake cylinder exhaust through the port 51. The movement of the main slide valve then brings the service port 55 into register with port 41 and fluid from the auxiliary reservoir flows into the brake cylinder. When the auxiliary reservoir pressure has reduced by flow to the brake cylinder to substantially that in the train pipe, the triple piston moves the graduating valve to close the service port 55. Successive reductions in train pipe pressure with corresponding increases in brake cylinder pressure may be made in the usual manner, and in order to limit the maximum pressure in the brake cylinder to a predetermined degree a safety valve 75 may be connected to the passage 41, as by way of the passage 56. If, for any reason, in the case of the usual standard triple valve device, the train pipe pressure should be gradually reduced after the auxiliary reservoir has fully equalized into the brake cylinder, the auxiliary reservoir pressure would not, of course, be further reduced by flow to the brake cylinder, and consequently the auxiliary reservoir pressure, which is now higher than the train pipe pressure, would cause the triple valve piston to shift to emergency position, thus producing quick serial action through the train. According to my present improvements, however, at an intermediate point in the movement of the triple valve from service to emergency position, air is vented from the auxiliary reservoir, so as to arrest the movement of the parts, before emergency position is reached. For this purpose the service port 55 in the main slide valve 10 is adapted to register in the aforesaid intermediate position, as shown in Fig. 6, with a port 58 which leads preferably to a safety valve 76 adjusted to a low degree of pressure, for example, 30 pounds. It will now be seen that upon movement of the triple valve parts beyond service position to the position connecting ports 55 and 58, flow of air from the auxiliary reservoir through the port 55 takes place until the train pipe pressure again preponderates and thereupon the piston moves back and shifts the graduating valve 11 closing the port 55. The same action occurs upon making further gradual reductions in train pipe pressure, thus preventing the triple valve parts from moving to emergency position upon gradual reductions in the train pipe pressure after equalization of the auxiliary reservoir and brake cylinder pressures. Though the port 58 may be open to the atmosphere or a chamber, a safety valve is preferably interposed, so that upon continuing the reduction in train pipe pressure below 30 pounds or to whatever degree the safety valve may be set, the auxiliary reservoir pressure is no longer reduced and consequently the parts go to emergency position and cause an emergency application of the brakes.

Another feature of my invention consists in providing a quick action mechanism adapted to operate at all times upon a sudden reduction in train pipe pressure either prior to or following one or more service applications of the brakes. In order to carry out this part of the invention the emergency piston is operated by fluid from an independent source of pressure such as the supplemental reservoir 6 which is normally maintained at the full pressure of the system. The operation of this feature described in connection with an emergency application is as follows: Upon a sudden or emergency reduction in train pipe pressure the triple valve piston is shifted to emergency position and port 22 leading to one side of the emergency piston 18 is then connected by a cavity 59 with port 37 which leads to the supplemental reservoir 6 or other additional source of fluid pressure. Fluid at full supplemental reservoir pressure is then supplied to the chamber 21 at one side of the emergency piston, while the port 20 leading from the chamber 19 at the opposite side is connected by a cavity 60 in the main slide valve with a port 61 leading to the brake cylinder. It will now be seen that the opening of the quick action vent valve is at all times assured as the pressure of the fluid admitted from the supplemental reservoir to operate the emergency piston being normally held in reserve is always higher than even the full equalized pressure of the auxiliary reservoir and brake cylinder. In emergency position, port 29 leading to one side of the piston 27 and also to one side of the abutment 35, is connected by cavity 60 with the brake cylinder port 61. The higher supplemental reservoir pressure thereupon acts on the opposite side of the piston 27 and shifts the same to its outer position, in which, as shown in Fig. 4, communication is closed between ports 41 and 13, while the brake cylinder port 13 is opened to the valve chamber 25. As normally the piston 35 is in its outer position with its outer face open to auxiliary reservoir pressure, the movement of this piston in an emergency application depends on the brake cylinder pressure, and if the auxiliary reservoir has already been equalized into the brake cylinder by previous service applications of the brakes, then the opposing fluid pressures on the piston will be equal and no movement takes place. Under this condition fluid from the supplemental reservoir is at once admitted through the port 32 to the valve chamber 25 and thence to the brake cylinder passage 13 and the brake cylinder upon movement of the triple valve piston to emergency position. If there is no fluid in the brake cylinder, as where an initial emergency application of the brakes is made or if the auxiliary reservoir has not fully equalized into the brake cylinder in applying the brakes in service then the higher auxiliary reservoir pressure existing on the outer face 70 of the piston 35 is sufficient to shift the same to its inner position, as shown in Fig. 4. In this case, air first flows from the auxiliary reservoir through the passages 39 and 32 to the valve chamber 25 and thence to the brake cylinder. This flow continues until the auxiliary reservoir has fully equalized into the brake cylinder, and then the fluid pressures on the opposite sides of the piston having substantially equalized, the spring 38 assisted by the fluid pressure acting on the differential area of the larger piston head 70 shifts the piston to its outer position, as shown in Fig. 5, and air from the supplemental reservoir then flows to the brake cylinder. By this means it will be noted that a high pressure is obtained in the brake cylinder in an emergency application, while the piston valve 35 automatically cuts off the auxiliary reservoir from the supplemental reservoir when its communication is open to the brake cylinder so that only the usual degree of pressure due to equalization of the auxiliary reservoir into the brake cylinder is contained in the auxiliary reservoir and consequently the brakes may be readily released after an emergency application by the usual increase in train pipe pressure.

In the emergency action of the parts, the emergency piston 18 is of course held open until the supplemental reservoir has substantially equalized into the brake cylinder, the spring 23 then returning the piston and closing the vent valve 16. After an emergency application, the brakes may be released by increasing the train pipe pressure in the usual manner, which shifts the triple valve piston and the main slide valve and auxiliary valve to release position. In this position port 31 is connected to the exhaust port 50, so that fluid is vented from the piston head 30 and the unbalanced fluid pressure acting on the large piston head 27 thereupon shifts the parts to normal release position, as shown in Fig. 2, in which position the cavity 26 in the valve 24 connects the brake cylinder port 13 with the port 41. Fluid in the brake cylinder is then exhausted to the atmosphere and the brakes are released. The rapid action of the separate emergency pressure controlling valve may be further aided by means of the construction shown in Fig. 10 in which the piston 35ª corresponding with the piston 35 in the construction of Fig. 2 is provided with a reduced portion 80 having a groove 81. Opening into the intermediate space 82 is a small port 83 leading to the supplemental reservoir passage 37. When the piston 35ª is at its extreme inner position opening the auxiliary reservoir communication to the brake cylinder the groove 81 is cut off from the space 82, but as soon as the auxiliary reservoir pressure equalizes into the brake cylinder the action of the spring 38ª together with the action of the fluid pressure of the differential area of the piston between the heads 70ª and 71ª moves the piston outwardly a slight amount, communication is opened from space 82 through groove 81 to a groove 84 in the casing and air from the supplemental reservoir is admitted to the inner end of the piston. This additional high pressure on the piston causes the same to shoot over to its outer position with a quick snap like movement, thus reducing the time of getting the high supplemental reservoir pressure to the brake cylinder after equalization of the auxiliary reservoir.

The triple valve may be provided with the quick service feature, similar to that covered by certain of my prior applications, if desired, and for this purpose, a port 62 in the main slide valve is so located as to register with the port 61, leading to the brake cylinder upon movement of the parts to service application position. This port 62 is then connected by a cavity 63 in the graduating valve 11 with a port 64 opening into the main slide valve cavity 48, the cavity 48 having a branch port 65 which is adapted to register with port 44 leading to the train pipe vent passage 14. It will now be evident that with my improvement air is vented from the auxiliary reservoir side of the triple valve piston in a position intermediate service application and emergency position, so that any gradual reduction in train pipe pressure will be prevented from causing the movement of the parts to emergency position, while on the other hand, the emergency valve mechanism being actuated by fluid under pressure normally held at the full pressure of the system, its operation is insured whenever the parts are moved to emergency position by a sudden reduction in train pipe pressure, even after a service application or full equalization of the auxiliary reservoir pressure into the brake cylinder. It will be understood that movement of the parts to emergency position is not prevented when a sudden reduction in train pipe pressure is made for the reason that the more rapid movement of the valves upon such a reduction does not permit of a sufficient escape of auxiliary reservoir pressure as the port 55 passes over the port 58 so as to reduce that pressure below the train pipe pressure, consequently the parts move out to emergency position.

Having now described my invention, what I claim as new and desire to secure by Letters Patent, is:—

1. In a fluid pressure brake, the combination with a train pipe and a triple valve device subject to the opposing pressures of a train pipe and a chamber, of means for venting fluid from said chamber to a space other than the train pipe to prevent movement of the triple valve device from service to emergency application position.

2. In a fluid pressure brake, the combination with a train pipe and a triple valve device subject to the opposing pressures of the train pipe and a chamber and having a service and an emergency application position, of means for venting fluid from said chamber to the atmosphere upon movement of the triple valve device from service position to prevent movement thereof to emergency application position.

3. In a fluid pressure brake, the combination with a train pipe and triple valve device subject to the opposing pressures of the train pipe and a chamber and having a service and an emergency application position, of means for venting fluid from said chamber to a space other than the train pipe in a position intermediate service and emergency application positions to thereby prevent movement of the triple valve device to emergency application position upon a gradual reduction in train pipe pressure after equalization of the train pipe and chamber pressure.

4. In a fluid pressure brake, the combination with a train pipe, auxiliary reservoir, and a triple valve device subject to the opposing pressures of the train pipe and auxiliary reservoir and having a service and an emergency application position, of an emergency valve mechanism controlled by said triple valve device for effecting an emergency application of the brakes and means for venting fluid from the auxiliary reservoir to a space other than the train pipe in a position intermediate service and emergency application positions, to thereby prevent movement of the triple valve device to emergency position upon a gradual reduction in train pipe pressure after equalization of the train pipe and the auxiliary reservoir pressures.

5. In a fluid pressure brake, the combination with a train pipe and an automatic valve device subject to the opposing pressures of the train pipe and a chamber and having a service and an emergency application position, of a safety valve device and means for venting fluid from said chamber through the safety valve device upon movement of the automatic valve device from service application position toward emergency application position.

6. A triple valve device having a position for effecting an emergency application of the brakes and comprising valve means and a piston subject to the opposing pressures of the train pipe and auxiliary reservoir and having ports adapted to vent air from the auxiliary reservoir side of the piston to the atmosphere in a position intermediate service application and emergency positions.

7. In a fluid pressure brake, the combination with a train pipe, auxiliary reservoir, triple valve device, and an additional source of fluid pressure, of an emergency valve mechanism including a movable abutment having one side supplied with fluid from the auxiliary reservoir in the release position of the triple valve device and with fluid from the additional source in emergency application position.

8. In a fluid pressure brake, the combination with a train pipe, auxiliary reservoir, triple valve device, and an additional source of fluid pressure, of an emergency valve mechanism including a movable abutment having one side supplied with fluid from the auxiliary reservoir in the release position of the triple valve device and with fluid from the additional source in emergency application position, the triple valve device being adapted in emergency position to vent fluid from the opposite side of said abutment.

9. In a fluid pressure brake, the combination with a train pipe, auxiliary reservoir, triple valve device, and an additional source of fluid pressure, of a valve mechanism operated by the opposing pressures of the brake cylinder and said additional source of fluid pressure upon a sudden reduction in train pipe pressure to cause quick action.

10. In a fluid pressure brake, the combination with a train pipe, auxiliary reservoir, triple valve device, and an additional source of fluid pressure, of an emergency valve means operated by fluid from said additional source of fluid pressure for effecting an emergency application of the brakes upon a sudden reduction in train pipe pressure and means for preventing movement of the parts to emergency position upon a gradual reduction in train pipe pressure.

11. In a fluid pressure brake, the combination with a train pipe, auxiliary reservoir, triple valve device, and a supplemental reservoir, of a valve mechanism operated by fluid from the supplemental reservoir in the emergency position of the triple valve device to produce quick action and means for venting air from the auxiliary reservoir side of the triple valve device upon a gradual reduction in train pipe pressure to prevent movement of the parts to emergency position.

12. In a fluid pressure brake, the combination with a train pipe, auxiliary reservoir, triple valve device, and a supplemental reservoir, of an emergency valve means operated by fluid from the supplemental reservoir for producing quick action and for supplying air from the supplemental reservoir to the brake cylinder.

13. In a fluid pressure brake, the combination with a train pipe, auxiliary reservoir, triple valve device, and a supplemental reservoir, of an emergency valve means operated by fluid from the supplemental reservoir for producing quick action and for supplying air from the supplemental reservoir to the brake cylinder and means for preventing action of the emergency valve means upon a gradual reduction in train pipe pressure.

14. In a fluid pressure brake, the combination with a train pipe, auxiliary reservoir, triple valve device, and a supplemental reservoir, of a valve mechanism operated by fluid from the supplemental reservoir in the emergency position of the triple valve device to produce quick action and to supply air from the supplemental reservoir to the brake cylinder upon a sudden reduction in train pipe pressure and means for preventing movement of the triple valve device to emergency position upon a gradual reduction in train pipe pressure.

15. In a fluid pressure brake, the combination with a train pipe, auxiliary reservoir, triple valve device and an additional source of fluid pressure, of a quick action valve mechanism operating upon a sudden reduction in train pipe pressure to effect quick action and a separate valve device for controlling communication from the auxiliary reservoir and from said additional source of fluid pressure to the brake cylinder.

16. In a fluid pressure brake, the combination with a train pipe, auxiliary reservoir, triple valve device and an additional source of fluid pressure, of a quick action valve mechanism operating upon a sudden reduction in train pipe pressure to effect quick action, a separate valve device for controlling communication from the auxiliary reservoir and from said additional source of fluid pressure to the brake cylinder, and means for effecting the rapid movement of said valve device from one of its positions to the other.

17. In a fluid pressure brake, the combination with a train pipe, auxiliary reservoir, triple valve device and an additional source of fluid pressure, of a quick action valve mechanism operating upon a sudden reduction in train pipe pressure to effect quick action, a separate valve device having one position for supplying air from the auxiliary reservoir to the brake cylinder in an emergency application and another position for supplying air from said additional source of fluid pressure to the brake cylinder, and means for causing the rapid movement of said device from the first mentioned position to the second.

18. In a fluid pressure brake, the combination with a train pipe, auxiliary reservoir, triple valve device and an additional source of fluid pressure, of a quick action valve mechanism operating upon a sudden reduction in train pipe pressure to effect quick action, a separate valve device having one position for supplying air from the auxiliary reservoir to the brake cylinder in an emergency application and another position for supplying air from said additional source of fluid pressure to the brake cylinder, and means for supplying air from said additional source of fluid pressure to one side of the separate valve device upon preliminary movement of same in the direction to open the communication for supplying air from the additional source of fluid pressure to the brake cylinder.

19. In a fluid pressure brake, the combination with a train pipe, auxiliary reservoir, triple valve device and an additional source of fluid pressure, of a quick action valve mechanism operated by fluid from the additional source of fluid pressure in an emergency application of the brakes and a separate valve device subject upon a sudden reduction in train pipe pressure to the opposing pressures of the auxiliary reservoir and brake cylinder for controlling communication from the auxiliary reservoir and from said additional source of fluid pressure to the brake cylinder.

20. In a fluid pressure brake, the combination with a train pipe, auxiliary reservoir, triple valve device and an additional source of fluid pressure, of a quick action valve mechanism and a separate valve device subject to the opposing pressures of the auxiliary reservoir and brake cylinder for controlling communication from the auxiliary reservoir and from said additional source of fluid pressure to the brake cylinder in an emergency application of the brakes and adapted in one position to close communication from the additional source of pressure and supply air to the brake cylinder from the auxiliary reservoir and in another position upon substantial equalization of the auxiliary reservoir pressure into the brake cylinder to close the auxiliary reservoir communication and supply air to the brake cylinder from the additional source of fluid pressure.

21. In a fluid pressure brake, the combination with a train pipe, a triple valve device and an additional source of fluid pressure, of a quick action valve device operated upon movement of the triple valve device to emergency application position for venting fluid from the train pipe, an emergency valve mechanism operated upon movement of the triple valve device to emergency position for supplying fluid from the additional source of fluid pressure to the brake cylinder, means for closing the quick action valve upon equalization of fluid pressures into the brake cylinder, and means for maintaining the emergency valve mechanism in open position.

22. In a fluid pressure brake, the combination with a train pipe, triple valve, auxiliary reservoir, and an additional source of fluid pressure, of an emergency valve mechanism operated by fluid from said additional source of fluid pressure for producing quick action and for supplying air from the additional source of fluid pressure to the brake cylinder and means for preventing the operation of said emergency valve mechanism upon gradual reductions in train pipe pressure.

23. In a fluid pressure brake, the combination with a train pipe, auxiliary reservoir, supplemental reservoir and triple valve device comprising a piston subject to the opposing pressures of the auxiliary reservoir and train pipe and valve means operated thereby for controlling the supply of air from the auxiliary reservoir to the brake cylinder, of an emergency valve mechanism operated by fluid from the supplemental reservoir supplied upon movement of the triple valve device to emergency position for effecting quick action and for supplying air from the supplemental reservoir to the brake cylinder and means for venting air from the auxiliary reservoir side of the triple valve piston in the movement of the parts toward emergency position, to prevent emergency action upon gradual reductions in train pipe pressure.

24. In a fluid pressure brake, the combination with a train pipe, auxiliary reservoir, and brake cylinder, of a triple valve device operating in response to a sudden reduction in train pipe pressure for effecting an emergency application of the brakes, means for reducing the auxiliary reservoir pressure to prevent movement of the triple valve to emergency position, and a safety valve device for limiting the reduction in auxiliary reservoir pressure to a predetermined degree.

25. In a fluid pressure brake, the combination with a train pipe and an automatic valve device subject to the opposing pressures of the train pipe and a chamber and having a service and an emergency application position, of means for venting fluid from said chamber upon movement of the automatic valve device from service toward emergency application position and means for limiting the reduction in pressure in said chamber to a predetermined degree.

26. In a fluid pressure brake, the combination with a train pipe and an automatic valve device subject to the opposing pressures of the train pipe and a chamber and having a service and an emergency application position of means for venting fluid from said chamber upon movement of the automatic valve device from service toward emergency application position and a safety valve device for limiting the reduction in pressure in said chamber to a predetermined degree.

27. In a fluid pressure brake, the combination with a train pipe and a triple valve device subject to the opposing pressures of the train pipe and a chamber and having a service and an emergency application position, of means for opening a communication for venting fluid from said chamber in a position intermediate service and emergency positions to thereby prevent movement of the triple valve device to emergency application position upon a gradual reduction in train pipe pressure after equalization of the train pipe and chamber pressures and a safety valve device controlling said communication for limiting the reduction in chamber pressure to a predetermined degree.

28. In a fluid pressure brake, the combination with a train pipe and a triple valve device subject to the opposing pressures of the train pipe and a chamber and having a service and an emergency application position, of means for opening a communication for venting fluid from said chamber in a position intermediate service and emergency application positions to prevent movement of the triple valve device to emergency application position upon a gradual reduction in train pipe pressure after equalization of the train pipe and chamber pressures, of a saftey valve device controlling said communication and adapted to limit the reduction in chamber pressure to a predetermined degree to thereby cause the movement of the triple valve device to emergency application position upon a gradual reduction in train pipe pressure below the degree of pressure at which the safety valve is adjusted.

In testimony whereof I have hereunto set my hand.

WALTER V. TURNER.

Witnesses:
 A. M. CLEMENTS,
 WM. M. CADY.